US006286059B1

(12) United States Patent
Sugiura

(10) Patent No.: US 6,286,059 B1
(45) Date of Patent: Sep. 4, 2001

(54) INFORMATION PROCESSING SYSTEM DISPLAYING A SELECTION STATE OF A PLURALITY OF DEVICES AT THE DEVICES BY A RESPECTIVE PLURALITY OF SELECTION CIRCUITS

(75) Inventor: Takashi Sugiura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/985,259

(22) Filed: Dec. 4, 1997

Related U.S. Application Data

(63) Continuation of application No. 08/363,958, filed on Dec. 27, 1994, now abandoned.

(30) Foreign Application Priority Data

Dec. 29, 1993 (JP) .................................................. 5-354544

(51) Int. Cl.[7] .................................................. G06F 19/00
(52) U.S. Cl. ............................ 710/14; 709/100; 709/220
(58) Field of Search ................................ 364/230, 228.2; 345/508, 503; 340/825.31; 709/100, 200, 220, 224; 710/14

(56) References Cited

U.S. PATENT DOCUMENTS 4,547,628 10/1985 Tamura et al. ....................... 178/2 B
4,780,821 * 10/1988 Crossley ............................... 709/100
5,073,965 12/1991 Konishi et al. ....................... 382/300
5,109,486 * 4/1992 Seymour .............................. 709/224
5,214,772 5/1993 Weinberger et al. ........... 395/184.01
5,307,458 * 4/1994 Freiburg et al. ..................... 345/503
5,398,257 3/1995 Groenteman ......................... 375/200
5,414,494 5/1995 Aikens et al. ....................... 355/202
5,444,517 8/1995 Nagashima ........................... 355/201
5,491,796 * 2/1996 Wanderer et al. ................... 709/224
5,548,722 * 8/1996 Jalalian et al. ....................... 709/220

* cited by examiner

*Primary Examiner*—Thomas Lee
*Assistant Examiner*—Thuan Du
(74) *Attorney, Agent, or Firm*—Fitzpatrick, Cella, Harper & Scinto

(57) ABSTRACT

An information processing system is connected to a plurality of devices, each device having a respective display and realizing at least one respective function from a plurality of functions, each device further being able to select any of the functions. The system includes a function control that controls the function of the devices and is connected to the devices. The function control causes the display of each of the devices to display a selection state indicating a status of function processing by all of the devices, and is responsive to selection of one of the functions at one of the devices to cause the selected function to be performed. In its operation, the function control can assign appropriate processing to at least one of the devices, or can transmit the results of function processing among the devices to enable addition/deletion/correction of the results.

9 Claims, 9 Drawing Sheets

FIG. 9

| TERMINAL | FUNCTION GENERAL ( SPECIAL ) | AVAILABILITY |
|---|---|---|
| FACSIMILE A | TRANSMITTING ( G3 ) | 0 |
| FACSIMILE B | TRANSMITTING ( G4 JPEG ) | 1 |
| PRINTER A | PRINT AT 300BPI | 0 |
| PRINTER B | COLOR PRINT AT 600BPI | 0 |
| FILING DEVICE | CAPACITY : 10M ( WITH SDRAM AND/OR HARD DISK ) | 0 |
| COPYING MACHINE | IMAGE READING, IMAGE PROCESSING, COLOR PRINTING ( HIGH-SPEED PROCESSING ) | 1 |
| PERSONAL COMPUTER A | EDITING | 0 |
| PERSONAL COMPUTER B | EDITING, IMAGE PROCESSING, ENCODING ( HIGH-PRECISION, JPEG, MPEG1&2 ) | 0 |

INFORMATION PROCESSING SYSTEM DISPLAYING A SELECTION STATE OF A PLURALITY OF DEVICES AT THE DEVICES BY A RESPECTIVE PLURALITY OF SELECTION CIRCUITS

This patent application is a continuation of U.S. application Ser. No. 08/363,958, filed Dec. 27, 1994, now abandoned.

BACKGROUND OF THE INVENTION

The present invention relates to an information processing system having a plurality of mutually-connected devices with a display such as a computer, a copying machine, a facsimile apparatus and a filing device, to realize various functions.

Related Art

In conventional systems of this type, system operation is made from a predetermined device, and generally, the operation method directly controls the respective devices.

However, in the conventional system, in case many devices are incorporated into the system, an operator has to operate at the predetermined device to use utilization of the system. Further, since the operation directly controls the devices, the operator has to have intimate knowledge of the respective devices to make the best use of the system.

For example, in a case where a copying machine is connected to the system and remotely-controlled from a host computer, the operator has to go to the host computer since this operation cannot be controlled at another device. This is very inconvenient if the host computer is located far from the operator.

SUMMARY OF THE INVENTION

The present invention has been made in consideration of the above situation, and has as an object to solve the above problems. The present invention has the following construction as an embodiment to attain the above object.

That is, the embodiment of the present invention is an information processing system having a plurality of mutually-connected devices, each having a display, the devices realizing various functions, comprising function control means for controlling function of an arbitrary device of the system from the display of one of the devices, wherein the function control means displays selection state for selecting one by processing functions on the display of one of the devices regardless of the respective devices, and wherein one of the devices selected by selecting one of the processing functions performs the processing by assigning the processing to the appropriate one of the devices.

Another embodiment of the present invention is an information processing system connected to a plurality of devices, each having a display, the devices realizing various functions, comprising function control means for controlling a function of an arbitrary one of the devices constructing the system from the display of one of the devices, wherein said function control means performs mutual transmission of the content of an operation among the devices for enabling addition/deletion/correction of the content of the operation at the respective devices.

For example, a predetermined ID number is added to the content of an operation, and the content of an operation is read out from any of the devices by the ID number.

The construction of the above embodiments enables control of one of the devices constructing the system from another one of the devices. In addition, since the method for the control is selecting a processing function from the respective operation units, it is not necessary that the operator understand the functions performable by the respective devices. The operator can simply select a desired function and the system automatically assigns the processing to an appropriate device. Otherwise, the devices share the execution of processing when the processing is complicated. Thus, processing fully utilizing the system can be performed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is an example of the structure of the function table.

DETAILED DESCRIPTION OF THE PREFERRED EMBODIMENT(S)

Preferred embodiments of the present invention will be described in detail in accordance with the accompanying drawings.

[First Embodiment ]

Figure 1:
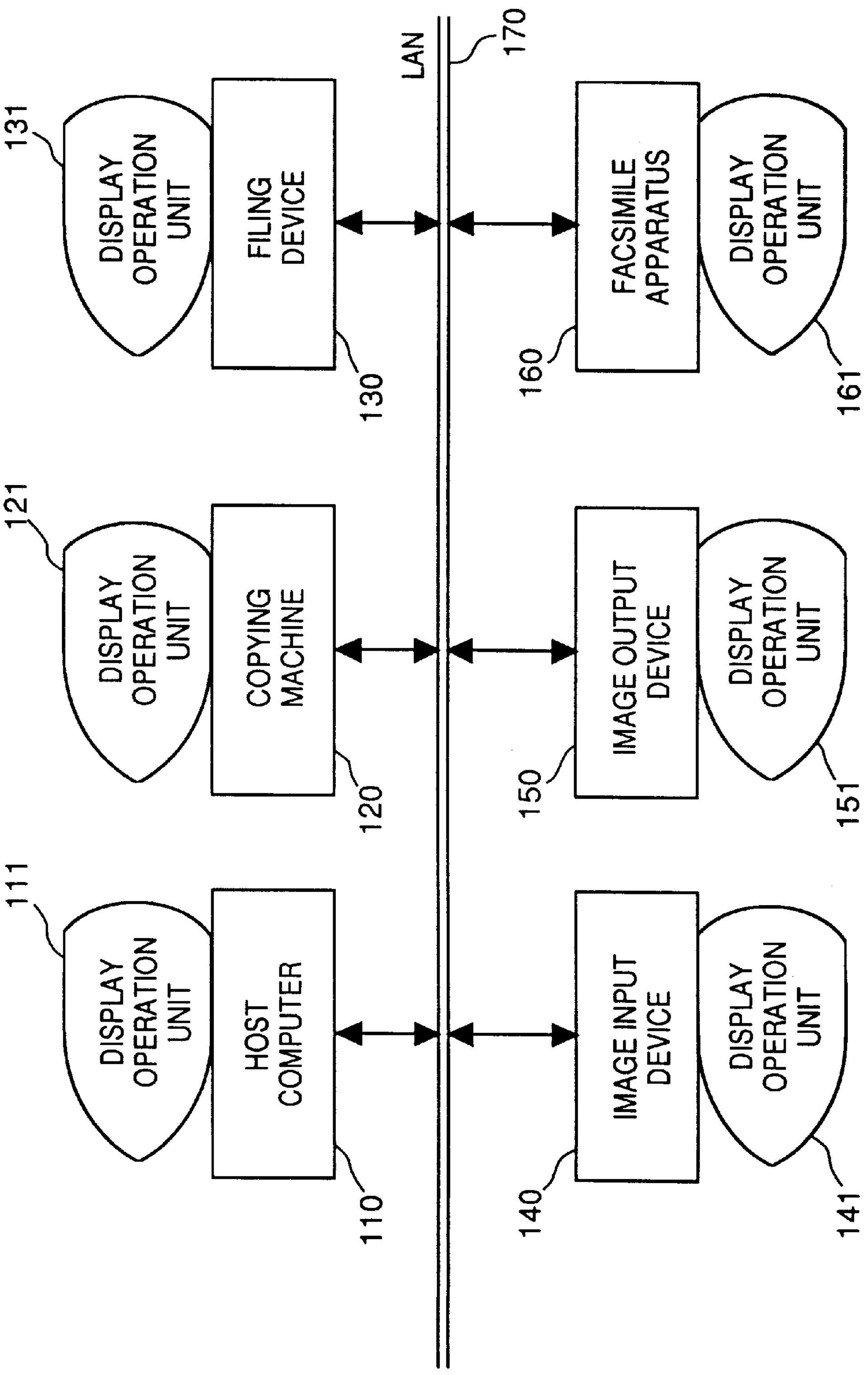
FIG. 1 is a block diagram showing the configuration of a system according to an embodiment of the present invention.

FIG. 1 shows an example of the configuration of an information processing system connected via a local area network to a plurality of devices having different functions, according to a first embodiment of the present invention. The respective devices have a display operation unit. In FIG. 1, all the devices have the display operation unit, however, in another configuration, only some of the devices may have the display operation unit. In this case, only the devices having the display operation unit can perform control upon the respective devices to be described later.

In FIG. 1, reference numeral 110 denotes a host computer having a display operation unit 111; 120, a copying machine having a display operation unit 121; 130, a filing device having a display operation unit 131; and 140, an image input device having a display operation unit 141. The system may comprise, e.g., a scanner, a flexible disk drive (FD), a magneto-optical disk drive (MOD), a CD-ROM etc. Although in FIG. 1, all of the devices of the present embodiment are connected to a LAN 170, this need not be so.

Numeral 150 denotes an image output device having a display operation unit 151; and 160, a facsimile apparatus having a display operation unit 161. The local area network (LAN) 170 is used for connecting the respective devices to each other. The respective devices can communicate with each other via the LAN 170.

The LAN 170 used in the present embodiment may be the Eithernet LAN connection, however, the present invention is not limited to the above connection. It is apparent that any other LAN connection, e.g., the token ring method, the ATM (Asynchronous Transmission Mode) method, or an interface technique such as memory sharing may be employed.

The respective devices in FIG. 1 have function control means for controlling various functions of the devices, and the function control means displays an image for selecting a processing function on the display operation unit regardless of the respective devices, and one of the devices selected by the selection of processing function performs processing by assigning the processing to an appropriate one of the devices. The construction of the present embodiment will be describe below with the copying machine 120 an an example.

Figure 2:
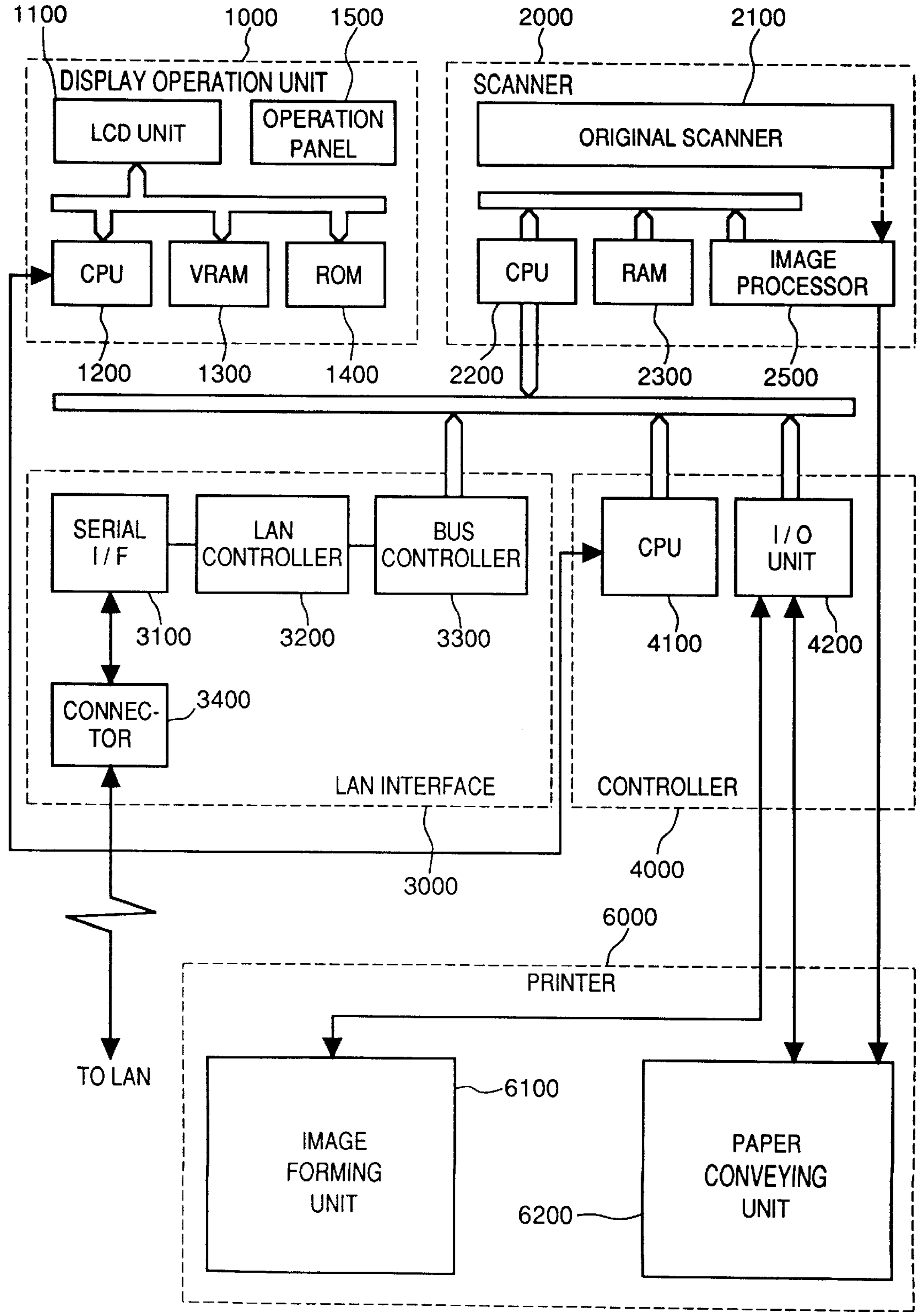
FIG. 2 is a block diagram showing the detailed construction of a copying machine in FIG. 1.

FIG. 2 shows the detailed construction of the copying machine 120. In FIG. 2, a display operation unit 1000 (corresponding to the display operation unit 121 in FIG. 1), a scanner 2000 and a controller 4000 respectively have a CPU, a ROM, a RAM and an I/O means, and control the operation of parts constructing the respective systems, based on control programs stored in the ROM.

The display operation unit 1000, for controlling a user interface of the copying machine, displays messages on an LCD unit 1100 and performs recognition of key input by a user. A CPU 1200 of the display operation unit 1000, for execution of copying operation and display of messages corresponding to the copying operation, performs data communication via a CPU 4100 of the controller 4000 and a serial transmission line.

For example, if paper jam occurs at a paper conveying unit 6200 of a printer 6000, i.e., paper remains in the paper conveying unit at time where the copying has finished, the CPU 4100 detects the paper jam status by sensor input from an I/O unit 4200, and sends a paper-jam message to the CPU 1200. The CPU 1200 reads a character code array corresponding to the paper-jam message from the ROM 1400, finds a character pattern in bitmap format corresponding to the character codes from a ROM 1400, and maps the patterns in a VRAM 1300. The CPU 1200 transfers the content of the VRAM 1300 to the LCD display 1100, thus, displaying of a message is completed.

The controller 4000 controls the respective systems of the copying machine of the present embodiment, and thus controls the overall copying machine. The local bus connection the controller 4000 and the respective units is a local bus for the IEEE 802.3 standard medium access control (MAC).

Figure 3:
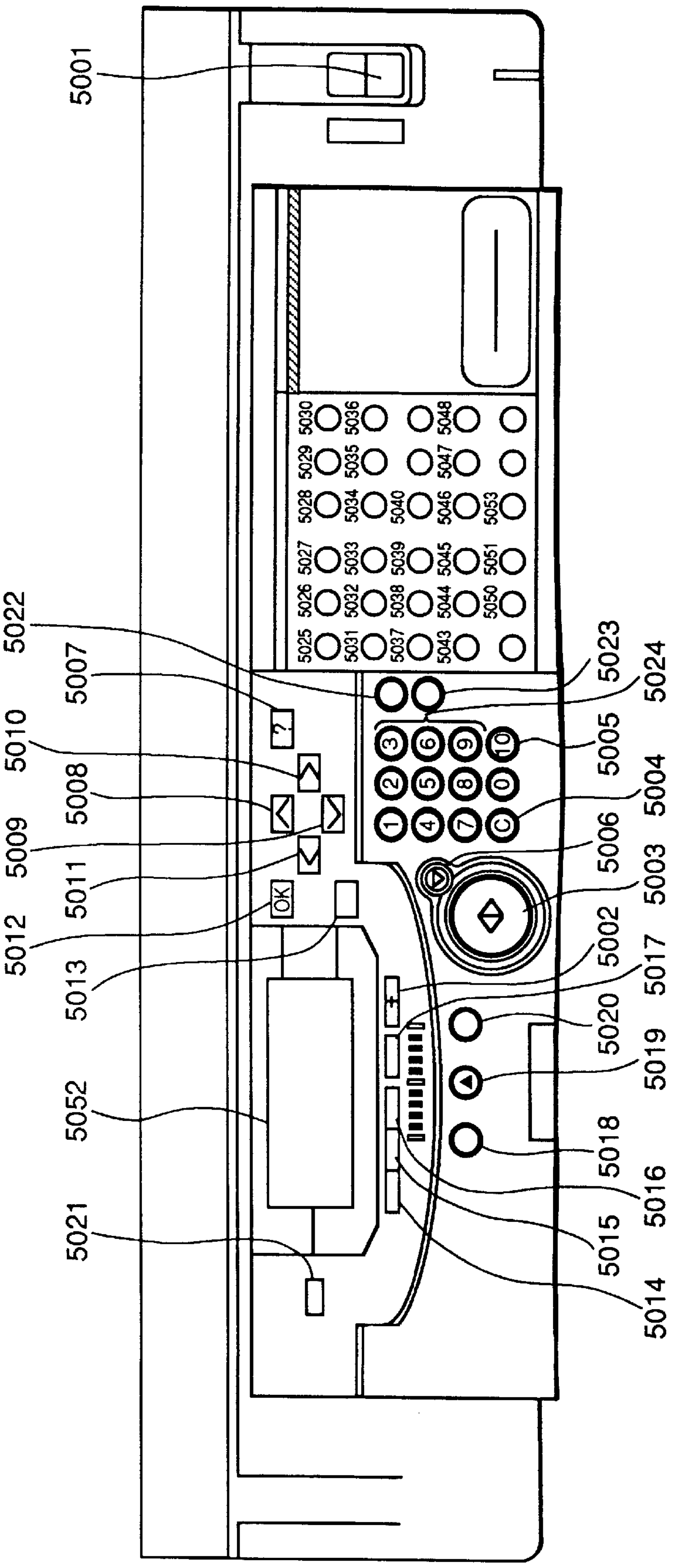
FIG. 3 is an overview of an operation panel of the copying machine in FIG. 2.

FIG. 3 is an overview of an operation panel 1500. In FIG. 3, numeral 5001 denote a power switch for controlling electricity supply to the respective units of the copying machine; 5002, a reset key which operations as a key for returning the current mode to a standard mode when the copying machine is in stand-by status, 5003, a copy start key; 5004, a clear key for clearing numeral values; and 5005, an ID key for allowing a specific user to perform copying operation and prohibiting users other than the specific user from performing copying operation unless ID is inputted by the keyboard. This ID key may be also used to add ID to each of the processing in the second embodiment.

Numeral 5006 denotes a stop key for interrupting or stopping copying; 5007, a guide key for informing various functions of the copying machine; 5008, an upper cursor key for moving a pointer in setting images of the various functions upward; and 5009, a lower cursor key for moving the pointer in the setting images downward.

Numeral 5010 denotes a right cursor key for moving the pointer in the setting images rightward; 5011, a left cursor key for moving the pointer in the setting images leftward; 5012, an OK key for confirming settings in the setting images of the various functions; 5013, an execution key for executing function outputted at the lower right portion of an image on a display 5052; and 5014, a size reduction key for reducing a standard copy size to another standard copy size.

Numeral 5015 denotes a same-size key for selecting copying in the same copy size; 5016, a zoom key for enlarging a standard copy size to another standard copy size; 5017, a cassette selection key for selecting a paper cassette used in copying; 5018, a density adjustment key for lowering a copying density; 5019, an AE key for automatically adjusting a copying density for the density of an original; and 5020, a density adjustment key for raising a copying density.

Numeral 5021 denotes a key for designating the operation of a sorter; 5022, a preheat key for ON/OFF operation of a preheat mode; 5023, an interruption key for interrupting copying and performing another copying operation; 5024, ten keys for inputting numeral values; 5025, a market processing key for setting trimming, masking and partial processing (outline processing, hatching processing, shadow processing, negative/positive processing etc.).

Numeral 5026 denotes a pattern processing key used for representing colors by patterns or density differences; 5027, a color deletion key for deleting a specific color; 5028, an image quality key for setting image quality; 5029, a negative/positive key for negative/positive processing; 5030, a image create key for outline processing, shadow processing, hatching processing, Italic-format processing, mirror processing, repeat processing etc.

Numeral 5031 denotes a trimming key for designating an area and performing trimming on the area; 5032, a masking key for designating an area and performing masking on the area; 5033, a partial processing key for designating an area and designating particle processing (outline processing, hatching processing, shadow processing, negative/positive processing etc.) within the area; 5034, a frame (casing) deletion key for deleting a frame from an image in accordance with one of a sheet frame deletion mode (to form a frame corresponding to a sheet size), an original frame deletion mode (to form a frame corresponding to an original size when the original size is designated) and a book frame deletion mode (to form blank at the center and the frame of an image corresponding to the size of a spread book when the spread book size is designated).

Numeral 5035 denotes a binding margin key for forming a binding margin at one end of a recording sheet; and 5036, a movement key for movement of an image, e.g., parallel movement (i.e., up-and-down and right-and-left directional movement), centering, corner movement, designated movement (i.e., movement to a designated point); 5037, a zoom key for setting zoom ratio from 25 to 400% in 1% unit, and for independently setting main-scanning zoom ratio and subscanning zoom ratio; 5038, an auto size change key for automatically changing copying size in accordance with the size of recording sheet, and for automatically setting main-scanning copying size and subscanning copying size independently; 5039, enlargement and continuous copy key for copying a page of original to obtain a plurality of enlarged images.

Numeral 5040 denotes a reduction layout key for copying a plural pages of original to obtain one page of reduced image; 5043, a continuous copy key for dividing a copying area of a glass platen into two areas and automatically copying two pages as two images (i.e., continuous page copying or double-sided copying); and 5044, a double-sided copy key for outputting the both sides of an original (i.e., one side original to double-sided output, continuous page original to double-sided output, and double-sided original to double-sided output).

Numeral 5045 denotes an overlay key for overlaying (i.e., overlaying copying and overlaying of continuous pages); 5046, a memory key for a mode using a memory (i.e., memory synthesizing, area synthesizing and openwork synthesizing); 5047, a projector key for using a projector; and 5048, a printer key for setting the printer.

Numeral 5050 denotes a mixed original key used when copying is performed using a feeder and the size of the originals are different; and 5051, a mode memory key for registering and selecting a copy mode. The display 5052 displays the status of the copying machine, the number of output images, the copying ratio, the size of recording sheet, and upon setting the copying mode, displays the settings.

Figure 4:
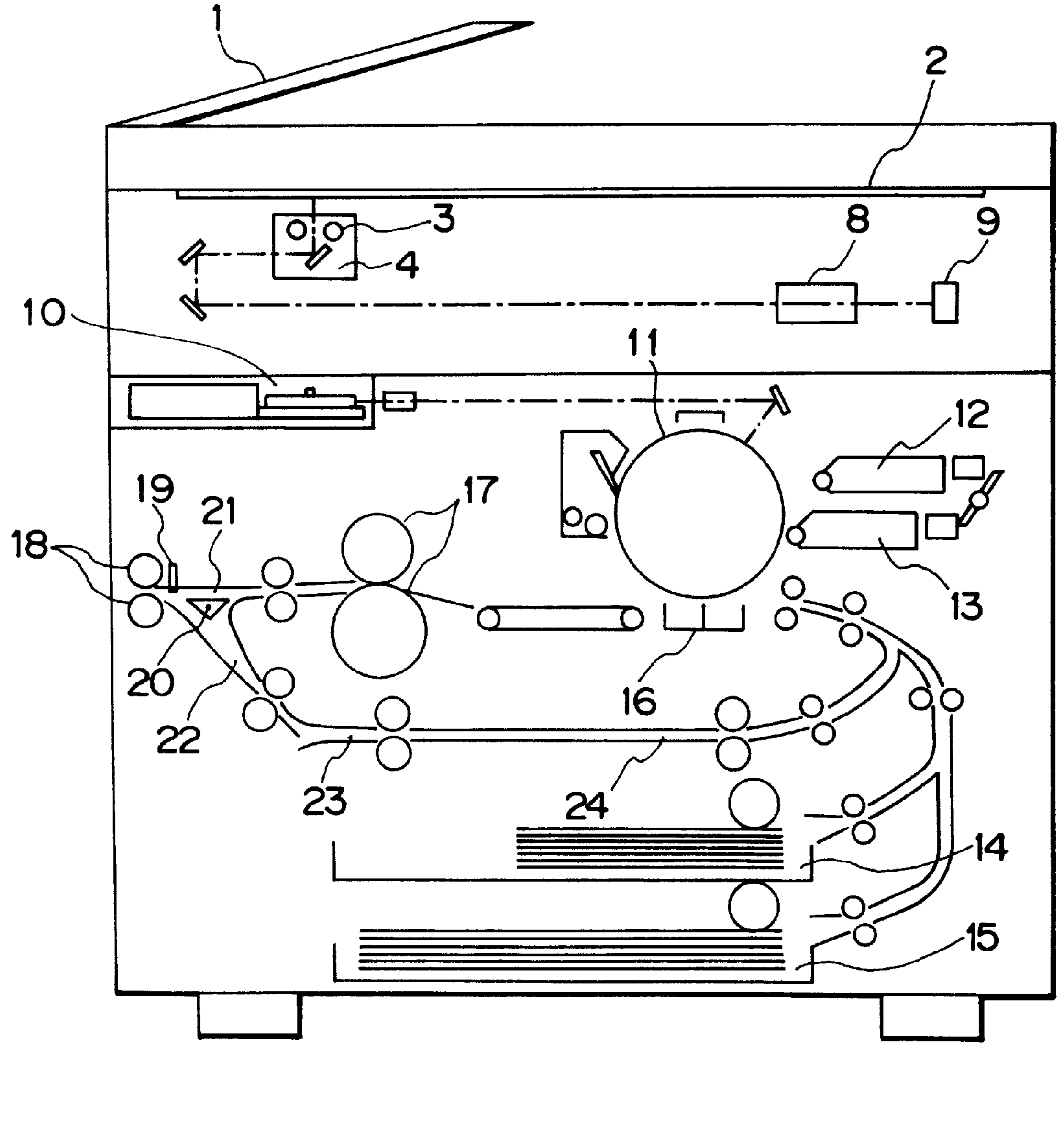
FIG. 4 is a cross-sectional view of the copying machine in FIG. 2.

FIG. 4 is cross-sectional view showing the construction of the copying machine 120. In FIG. 4, numeral 1 denotes an original feeder as original feeding means, for feeding originals placed on the original feeder by one sheet or two sheets onto a predetermined position of a glass platen 2: 4, an original scanner corresponding to the original scanner 2100 in FIG. 2, comprising a lamp 3, a scanning mirror 5 and the like. When the original is fed by the original feeder 1 onto the glass platen 2, the original scanner 4 is reciprocally moved in the predetermined directions, then reflection light from the original is passed through a lens 8 via the scanning mirrors 5 to 7, and an image is focused at an image sensor 9.

Numeral 10 denotes an exposure controller comprising a laser scanner, for irradiating a laser beam, modulated in accordance with image data outputted from an image signal controller of the controller, on an electrostatic drum 11; 12 and 13, developers for visualizing an electrostatic latent image formed on the electrostatic drum 11 with developing material (toner of a predetermined color; and 14 and 15, transfer sheet trays in which recording sheets of a standard size is contained. The recording sheet is conveyed by a conveying roller to a position of a resist roller, and re-fed in synchronization with output timing of the image formed on the electrostatic drum 11 so that the end of the recording sheet and the end of the image coincide.

Numeral 16 denotes a separation charger for separating the recording sheet from the electrostatic drum 11 after the toner image developed on the electrostatic drum 11 has been transferred onto the recording sheet; 17, a fixing unit for fixing the transferred image onto the recording sheet conveyed via the conveying belt; 18, a paper discharging roller for discharging the recording sheet after the completion of image formation to a tray 20; and 19, a direction flapper for changing the conveying direction of the recording sheet after the image formation to a direction for paper discharging exit or an inner conveyance direction for overlay/double-sided image formation process.

Figure 5:
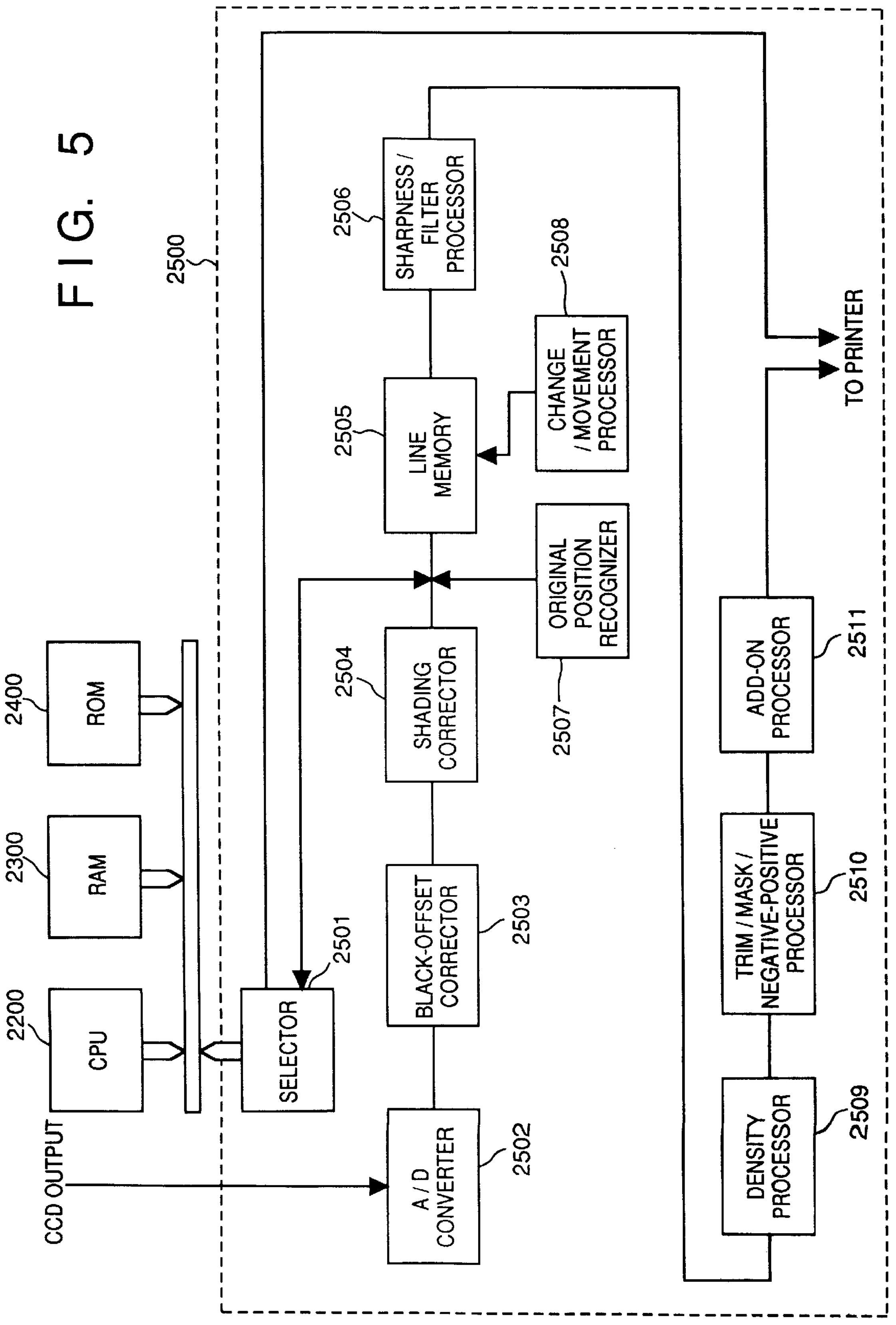
FIG. 5 is a block diagram showing an image processing unit of a scanner in FIG. 2.

In FIG. 2 an image processor 2500 performs various processings on image data obtained by the operation of an exposure system or reception via the LAN interface 3000 from an external device. FIG. 5 show the detailed constriction of the image processor 2500.

In FIG. 5, the original scanner 2500 as an optical scanning mechanism scans an original image, and inputs the scanned image signal into a CCD provided in the image sensor 9 In FIG. 4. An A/D converter 2502 converts the electric signals (analog)corresponding to the density of pixels, sequentially outputted from the CCD, into digital signals of levels corresponding to the pixel densities.

Thereafter, a black-offset corrector 2503 corrects the variation of black offset amount to correct the offset variation if a black density portion from a CCD analog amplifier. Next, a shading corrector 2504 corrects digital signal level to correct the variation of light quantity distribution from an original irradiating lamp, and temporarily stores the shading-corrected signal into a line memory (storage device) 2505. An original position recognizer 2507 recognizes the position of an original on the glass platen using the shading-corrected signal.

In the present embodiment, change of image size and movement of image are performed by changing timing of writing the image signal into the line memory 2505 and changing timing of reading the image signal from the line memory 2505 in response to the instruction from a change/movement processor 2508. Further, portrait processing, folding, repeat processing are performed by changing the way of reading the image signal from the line memory 2505. The signal read out of the line memory 2505 is transferred to a sharpness/filter/outline processor 2506.

The sharpness/filter/outline processor 2506 calculates the density level of each pixel for the respective processings, and the digital image signal, after the processing, is outputted to a density processor 2509. The density processor 2509 converts the digital signal level in accordance with copying density setting information of the copying machine, and outputs the level-converted digital signal to a trim/mask/negative-positive processor 2510.

A negative/positive processor of the trim/mask/negative-positive processor 2510 inverts the digital signal level and outputs the signal. A trim/mask processor of the processor 2510 performs trimming or masking by changing a signal level within/without a designated area to a designated density level, and outputs the processed digital image signal to an add-on processor 2511.

The add-on processor 2511 reads information of character designated from a memory where character information is stored in advance, and outputs the read information to a designated portion in place of the image signal. This final 0-bit digital signal is transferred to the printer 6000, where the light and dark portions of image are recorded on the electrostatic drum by ON/OFF controlling the laser beam.

On the other hand, the scanner 2000 has a RAM 2300 as an image memory for storing original image information for plural page printout, and the scanner 2000 used the RAM 2300 for storing image data obtained from scanning an original image by the CCD or image data transferred via the LAN 170 from the host computer 110.

For example, if the copying machine is operated from another device on the LAN in a remote-control mode, image data transferred via the LAN interface 3000 from an external device connected to the LAN 170 is transferred by the CPU 4100 of the controller 4000 and the CPU 2200 of the scanner 2000 to the RAM 2300. At this time, the controller 4000 controls the operation of the copying machine based on commands transferred via the LAN from another device. Note that the CPU 4100 and the CPU 2200 perform communication via a dual port RAM in the CPU's.

Further, the CPU 2200 controls selection by a selector 2501 of the image processor 2500 which has channels 1 and 2 based on commands from the CPU 4100 of the controller 4000. Bitmap data in the RAM 2300 is directly transferred to the printer 6000 when the selector 2501 is connected to channel 1.

The image processor 2500 may sequentially processes image data read by the CCD, thereafter, store the processed data into the image memory 2300, and output the image data to an external device via the CPU 4100 of the controller 4000 and the LAN interface 3000. In this case, the selector 2501 is connected to channel 2, and the analog signal from the CCD is transferred to the CPU 2200 via the A/D converter 2502, the black-offset corrector 2503, the shading corrector 2504 and the selector 2501.

The CPU 2200 sequentially stores data from the selector 2501 into an appropriate area in the RAM 2300, based on scanning position information in the original scanner 2100. As the scanning has been completed, the CPU 2200 informs the CPU 4100 of the completion of the scanning. The CPU 4100 transmits an image data request command requiring the image data in the RAM 2300 to the CPU 2200, thereafter receives the image data transferred from the CPU 2200, and outputs the data to the external device via the LAN interface 3000 in accordance with necessity.

As described above, the copying machine 120 of the present embodiment works as a digital printer, as a peripheral device of an external device, and as a digital original scanner, further, as a stand-alone digital copying machine. The control for changing the respective functions is made based on control commands from the external device or an operation mode selection inputted from the operation panel.

The LAN 3000 interface in FIG. 2 comprises a serial interface 3100, a LAN controller 3200, a bus controller 3300 and a LAN connector 3400.

The LAN controller 3200, having a CPU, a program ROM, a work area RAM, and a FIFO buffer, controls the respective components of the LAN interface 3000. The LAN controller 3200 is connected to the local bus of the controller 4000 via the bus controller 3300. As described above, the local bus is for the IEEE 802.3 standard MAC. That is, the CPU 4100 of the controller 4000 accesses the LAN interface 3000 via specific I/O space. Upon data transmission/reception, the bus controller 3300 is employed. The FIFO buffer, though not shown, is for temporarily storing the transmission/reception data. Communication at higher transfer speed can be realized by increasing the FIFO buffer capacity.

The serial interface 3100 performs serial data transmission/reception and conflict detection represented by CSMA (Carrier Sense Multiple Access)/CD. That is, data processed in the LAN controller 3200 is converted by the Manchester encoding method into Ethernet data, and the Ethernet data is converted by the Manchester decoding method into data in format of the LAN controller 3200. The converted data is outputted onto the LAN 170 via the LAN connector 3400.

The LAN interface 3000 of the present embodiment realizes the Ethernet LAN connection. Further, the data communication between the CPU 4100 and the LAN interface 3000 is performed based on an I/O method.

Figure 6:
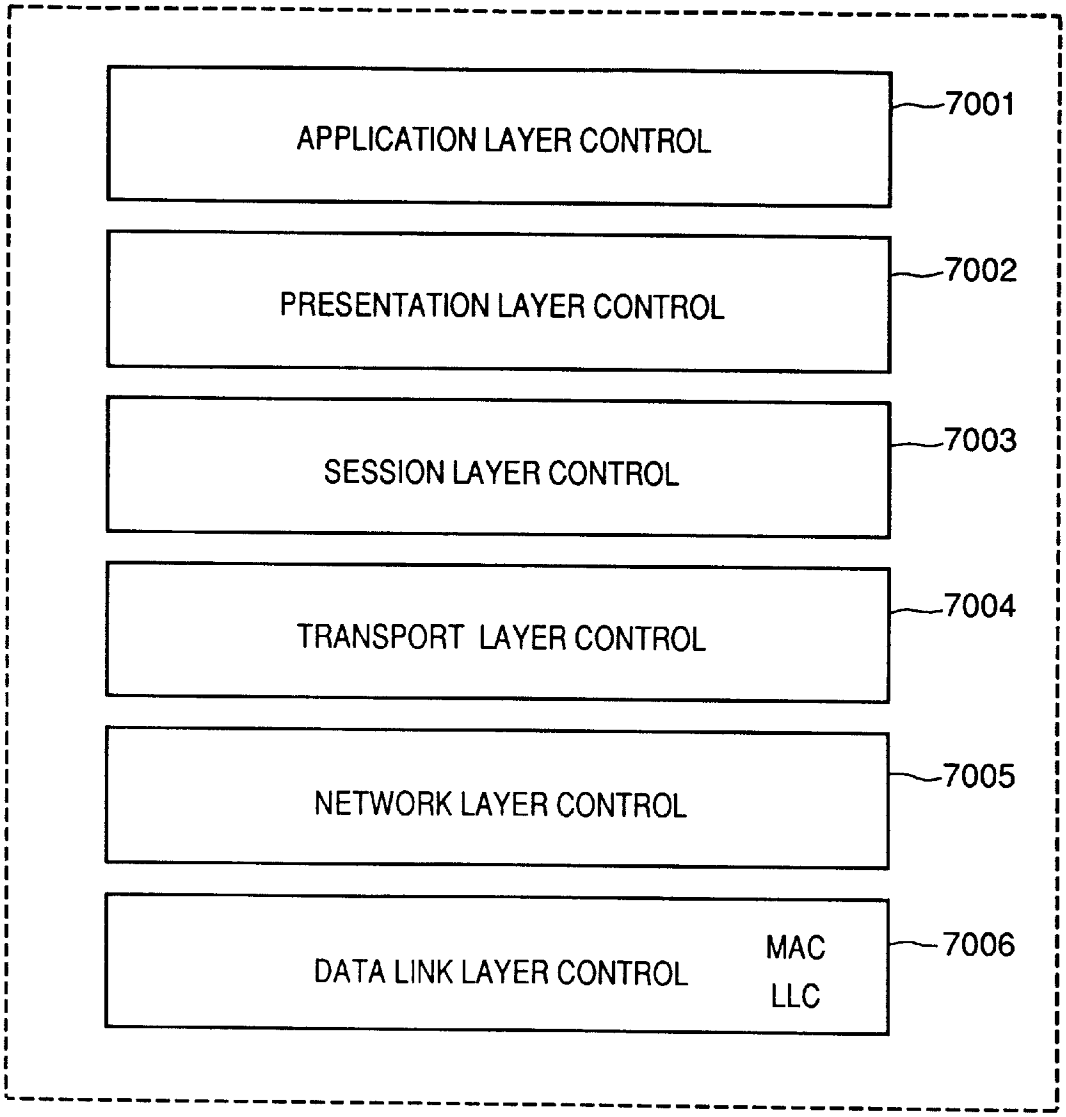
FIG. 6 is a block diagram showing the construction of communication program executed in the embodiment.

FIG. 6 shows the construction of a communication control program executed by the CPU 4100 of the controller 4000.

The communication control program has a construction corresponding to the OSI (Open Systems Interconnection) standard. That is, the program comprises program modules for an application layer control 7001, a presentation layer control 7002, a session layer control 7003, a transport layer control 7004, a network layer control 7005 and a data rink layer control (with medium access control means—MAC and logic link control means—LLC as subcontrols) 7006.

When data transmission requirement is generated, the program module of the respective layer passes data to the program module of the next lower layer. At this time, protocol control information is added to the transmission data, and the receiving module side removes excessive protocol control information from the data in accordance with the corresponding layer, and passes the data to the program module of the next higher layer.

As shown in FIG. 1, the LAN network is connected to the host computer 110 that supports a protocol identical to the above protocol, the filing device 130 as the large capacity storage device and the image output device 1150 and the like, and mutual data communication among the copying machine 120 and these devices is possible.

<Operation Procedure>

Next, system control in accordance with the operation procedure of the present embodiment will be described below. Specifically, the system control in accordance with the operation procedure in the LAN network in FIG. 1 and the network of the copying machine 120 in FIG. 2 will be described. Note that the detailed explanations of the other components connected to the LAN 170 will be omitted.

Figure 7:
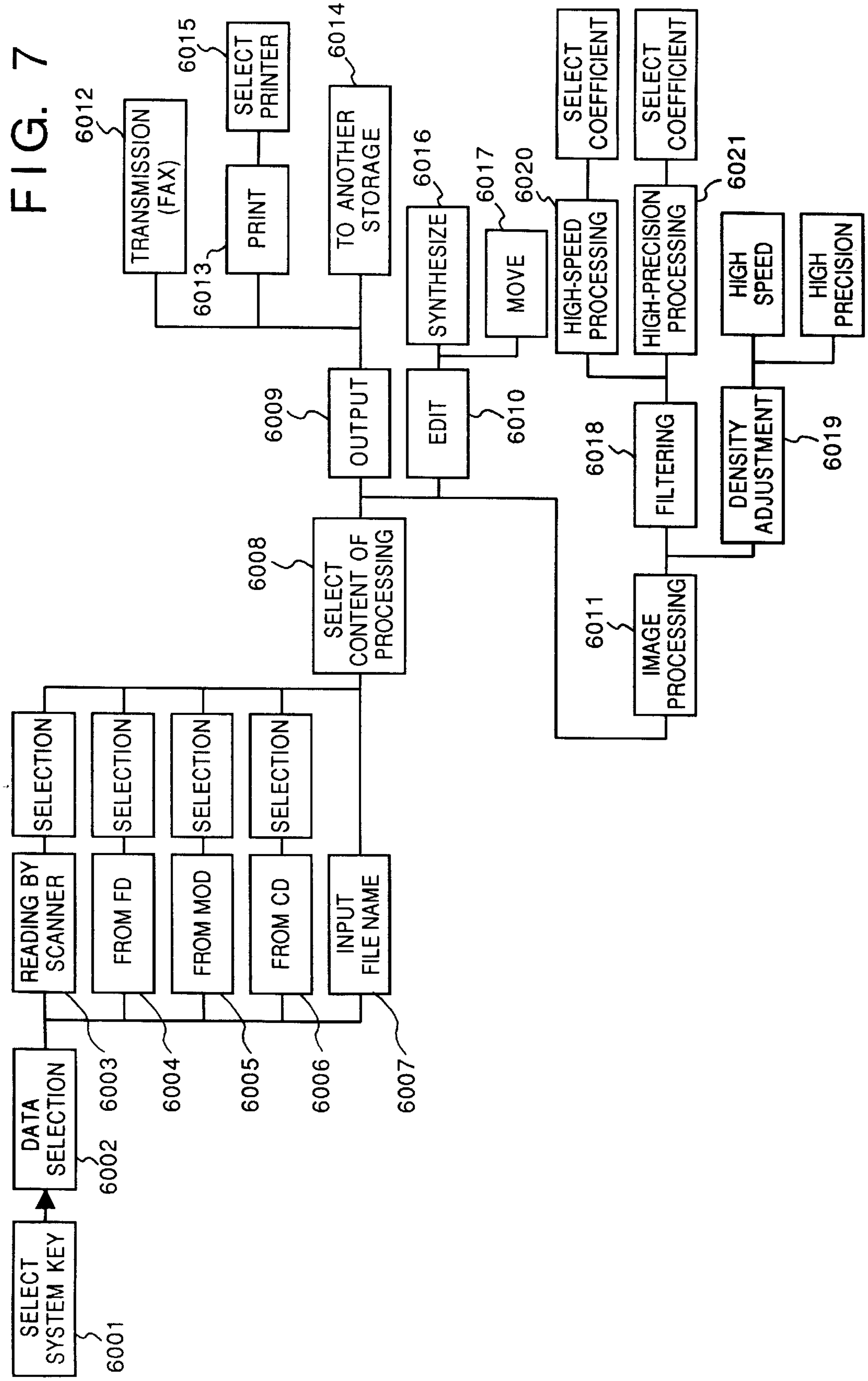
FIG. 7 is a block diagram showing the control procedure of the system of the embodiment.

Although the operation can be commonly made from any of the devices, the description will be made in case of the display operation unit 1000 of the digital copying machine in FIG. 2 with reference to FIG. 7. In FIG. 7, for example, a function table may be prepared from the functions of the respective devices, and processing selection to be described later can be made from any of the devices in the same control.

The display operation unit 1000 normally displays a standard image of copying function. This standard image is used when the copying machine is used as stand-alone apparatus. However, if combined processing is performed using the system, a system key is selected as shown in block 6001. If the system key has been selected, a data selection image is displayed as shown in block 6002, and a component from which data to be used is read or a file to be used is selected in accordance with the selection image.

For example in FIG. 1, the host computer 110, the copying machine 120, the filing device 130 and the image input device 140 (as described later, there are three types of image input devices) is selected. More specifically, processing for reading an original image from the scanner 2000 as shown in block 6003, processing for reading an image stored in the flexible disk drive (FD) as shown in block 6004, processing for reading an image stored in the magneto-optical disk drive (MOD) as shown in block 6005, and processing for reading an image stored in a CD-ROM as shown in block 6006 is selected.

The actual operation procedure after the selection (e.g., in case of the FD, selecting a drive, selecting a file name, etc.) is generally known, therefore the detailed explanation of the procedure will be omitted. When the file for the processing is selected, the content of the processing is selected as shown in block 6008. At this time, at the display operation unit, one of output (6009), edit (6010), image processing (6011) is selected. If output (6009) is selected, then an output destination is selected.

That is facsimile transmission (6012) from the facsimile apparatus 160, printing (6013) from the image output device 150 or the printer 6000, or storing into a storage device (6014) such as the filing device 130 is selected. In case of printing (6013), if a plurality of printer are connected, a printer is selected (6015). Specifically, the image output device 150 or the printer 6000 is selected. In case of storing data into another storage device (6014), the type of storage device, the drive of the device etc. are selected.

In case of edit (6010), the content of editing is selected. Though the editing includes many types of functions, in this embodiment, synthesize (6016) or movement (6017) is selected, and the explanation of processing after the selection will be omitted.

In case of image processing (6011), the content of the processing is selected. In this embodiment, filtering processing (6018) for shading off an image or density adjustment processing (6019) for adjusting the entire image density is selected. If the filtering processing is selected, next, high-speed processing (6020) or flexible and minute adjustment (6021) in spite of long processing period is selected. If high-speed processing is desired, a selection image for selecting an allowable filtering coefficient for high-speed processing is displayed, and a coefficient is selected and the high-speed processing is performed. If high-precision processing (6021) is selected, approximate processing time and a selection image for selecting an allowable filtering coefficient for minute adjustment are displayed. Then, a filtering coefficient is selected and the processing is performed. In case of density adjustment processing (6019), similar selection of high-speed processing or high-precision processing is made.

In the above description, the operation procedure of a case where the respective components are connected to a network as shown in FIG. 1. In a case where other devices are connected to the network, the operation procedure will be different from the above-described operation procedure.

The feature of the present embodiment is the selection or high-speed processing (6020) or high-precision processing (6021) in, e.g., image processing (6011). If the high-speed processing (6020) is selected, high-speed hardware filtering processing of the digital copying machine is selected.

On the other hand, if the high-precision processing (6021) is selected, it is determined that filtering by the host computer 110 connected to the LAN 170 is faster and easier than filtering by the copying machine 120, and the processing is assigned to the host computer 110 via the LAN 170. Thereafter, the processed data is received from the host computer 110 via the LAN I/O.

That is, an operator can use the most appropriate device of the system without intimate knowledge about the respective devices. Further, if a plurality of printers are connected to the system, a printer for output can also be selected. Although not described in the operation procedure, image processing of the facsimile apparatus can be used without designating the facsimile apparatus. For example, genesis processing by facsimile apparatus, error diffusion processing by digital copying machine, or flexible image processing by computer can be selected by forming a halftone processing selection image.

In addition, hardware of the digital copying machine may briefly perform image area separation processing, and thereafter, the host computer 110 may minutely perform the image area separation. Note that the respective devices share processing as in the present embodiment, image information must be transferred to the respective devices at each processing. For this reason, an interface for transferring image data at high-speed is required.

The above-described assignment is made by the CPU of the respective devices, however, it may be performed by the following method. That is, a function table showing the functions of the respective devices may be prepared with a network table at each device, and every time the device is connected to the LAN 170, the function table maybe updated. When processing is selected from a selection image, assignee(s) of the processing can be specified by referring to the function table. Note that control for updating the function table can be attained by a known technique. An example of the structure of the network table including the function table is shown in FIG. 9.

The network table shown in FIG. 9 is stored in the VRAM 1300 of the display operation unit 1000. The table contains information such as names of the terminals, functions and of the terminals and the availabilities of the functions (1:available, 0:not available). These contents of the table is displayed at LCD unit 1100. An appropriate terminal may be selected from a tatch-panel.

Note that such table is updated manually or automatically every time the terminal is connected to the LAN unit. The contents of the table is not limited to the above mentioned and may be changed to other information.

In the present embodiment, the LAN interface by the CPU power has been described, however, image information can be transferred at high-speed if the system is constructed such that in image transfer status, the interface is occupied, and image data is transferred in multi-bit format at a high frequency. It is understood that any method does not pose limitation upon the present invention.

As described above, according to the present embodiment, a user can control the system from a device near the user, and the user can make the best use of the functions of the respective devices by selecting a desired function without intimate knowledge about the respective devices.

[Second Embodiment]

Next, a second embodiment of the present invention will be described with reference to FIG. 8. In the second embodiment, the basic construction of the system is the same as that shown in FIGS. 1 to 6. In the second embodiment, an ID is allotted to the content of processing set by keyboard operation, and the set processing is registered with the ID. The operation procedure of the second embodiment will be described below.

The operation procedure of the above processing will be described with reference to FIG. 8.

Figure 8A:
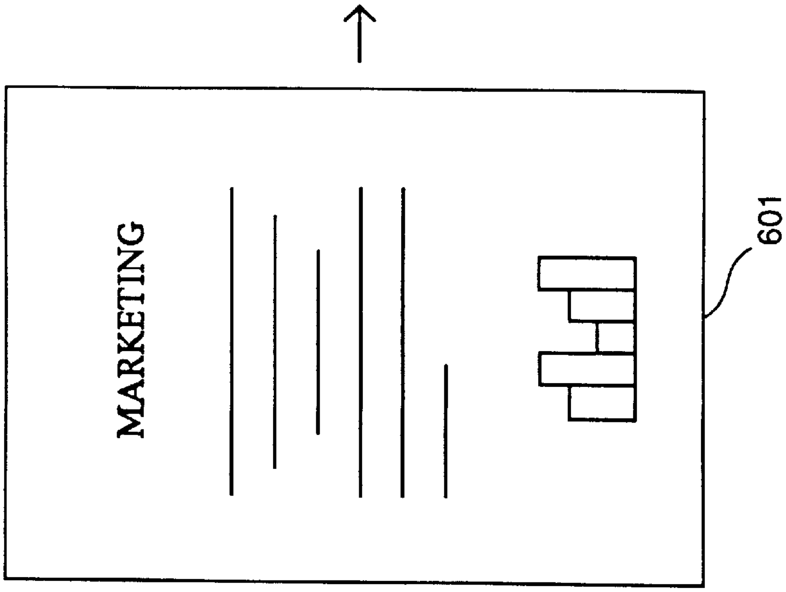
FIG. 8 shows the document content of an actual operation using the control procedure according to another embodiment of the present invention.
Figure 8B:
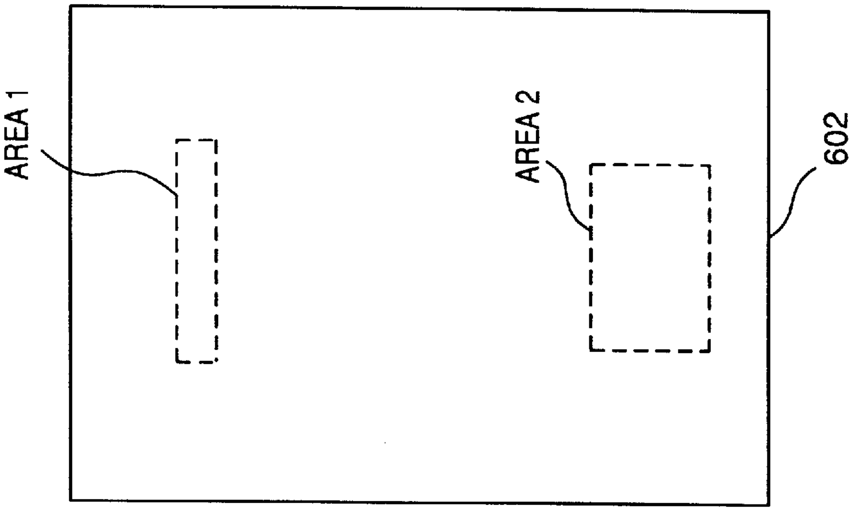
Figure 8C:
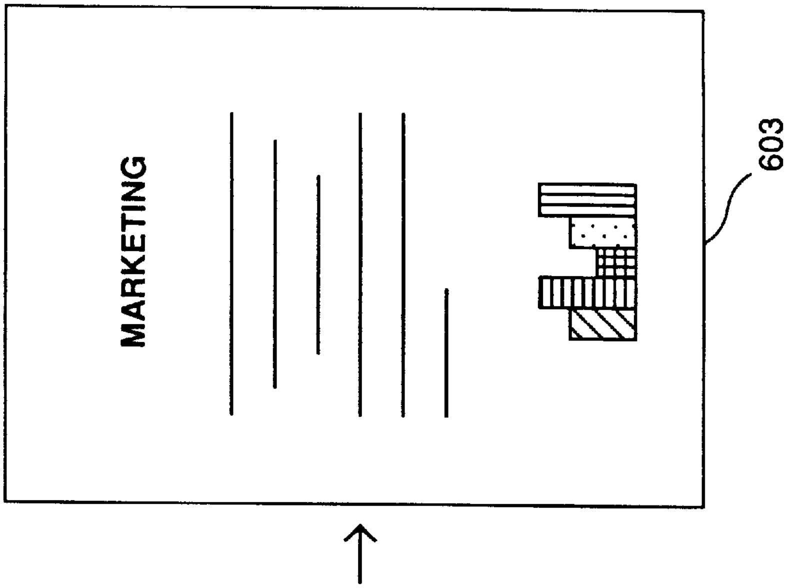

In this example, the original 601 as shown in (A) of FIG. 8 is copied many time.

In this example, an original 601 in a format (A) of FIG. 8 is copied many times. The original 601 includes a multicolor bar graph at the lower portion.

When the original 601 is copied by the operation from the display operation unit 1000 of the copying machine in FIG. 2, to emphasize a character portion processings following the settings can be subsequently performed in parallel, however, only the settings of these processings may be made and the actual processings may be executed later.

Assuming that requirement for obtaining a plurality of output images from copying the original 601 has occurred after several days interval, the operator merely inputs the ID's unique to the set processings from another device, e.g., the host computer 110. The copying machine 120 or the filing device 130 is referred to with these ID's, and the content of the operation can be read out. Then, the read operation content is stored into the memory of the operation device (the host computer 110).

Then, the display operation unit 111 displays the read operation content. The operator looks at the displayed operation contents, then adds operation such as designation of double-sided copying, designation of the number of copies, designation of sort-staple and setting of density to the operation content, and gives an ID different from the former ID to the operation to register the operation. That is, the operator can read the set operation from any of the devices only by inputting the ID of the operation, and can change the setting. The read ID is transferred from the CPU of the device which received the ID-input to another device via the LAN, and the device that holds the set operation content corresponding to the ID notifies that the device stores the operation content and transfers the stored operation content to the device from which the ID-input has been made.

Next, the operator takes the original to the copying machine 120 (or any device that can read the original), and reads out the operation content by inputting the ID of the desired operation content. Then the operator sets the original, makes necessary selection such as designation of paper size, and starts copying. Thus, a copied result as shown in FIG. 8 (C) is obtained.

Preferably, the ID in the above description is automatically assigned to the device to avoid repeatedly assigning the same ID, and the operator is informed of the ID at the display of a device. Otherwise, when the operator input the ID, the device may automatically search the same ID assigned for any other operation.

As described above, according to the second embodiment, the operator can omit re-setting of image processing at each copying, further, the operator can read the set operation content from any device connected to the LAN and update the operation content. That is, the operation content used at the copying machine 120 can be fed-back to the device such as the host computer 110 connected to the LAN, and the operation content can be stored in correspondence with a set ID so that the memory of the device can be used as a mode memory.

Further, complicated operation setting may be made at, e.g., the host computer 11, and simple operation may be made from, e.g., the copying machine. This simplifies the display operation unit of the copying machine. In this case, after the setting has been made at the host computer 110, another operator can use the copying machine 120 without any problem, before the original is actually read at the copying machine 120. The operator who has set the operation from the host computer 110 simply inputs the corresponding ID upon operating the copying machine 120.

Note that only the processing at the copying machine has been taken in the above description, however, similar operation can be made from any other devices connected to the LAN, e.g., the image output device 150, the image output device 140 and the facsimile apparatus 160. Further, setting of processing content similar to the second embodiment can be made at any other devices connected to the LAN.

The present invention can be applied to a system constituted by a plurality of devices, or to an apparatus comprising a single device. Furthermore, the invention is applicable also to a case where the object of the invention is attained by supplying a program to a system or apparatus.

As described above, according to the present embodiments, the devices of a system can be controlled from another device of the system, and the control can be made by selecting a processing function from the operation unit of one of the devices. Accordingly, as an operator only designates the content of desired processing, the processing is performed by the devices appropriate to the processing, otherwise, if the processing is complicated, some of the appropriate devices share the processing. Thus, the operator can make the best use of the system to perform desired processing.

As many apparently widely different embodiments of the present invention can be made without departing from the spirit and scope thereof, it is to be understood that the invention is not limited to the specific embodiments thereof except as defined in the appended claims.

What is claimed is:

1. An information processing system connected to a plurality of devices, the plurality of devices including respective displays and realizing at least one respective function of a plurality of functions, including a high-fidelity image processing function, wherein each device includes a selection circuit adapted for selecting one of the plurality of functions, said system comprising:

a function control circuit adapted for controlling the plurality of functions, including the high-fidelity image processing function, of the plurality of devices; and a connector for connecting said function control circuit to the plurality of devices, wherein said function control circuit causes the respective displays of the plurality of devices to display a selection state indicating a status of function processing by the plurality of devices, wherein said function control circuit is responsive to a selection of the high-fidelity image processing function at one of the plurality of devices to cause the selected high-fidelity image processing function to be performed by assigning appropriate image processing to at least one of the plurality of devices, and wherein said high-fidelity image processing function includes an image density processing.

2. An information processing system connected to a plurality of devices, the plurality of devices including respective displays and realizing at least one respective function of a plurality of functions, including a high-fidelity image processing function, wherein each device includes a selecting circuit adapted for selecting one of the plurality of functions, said system comprising:

a function control circuit adapted for controlling the plurality of functions, including the high-fidelity image processing function, of the plurality of devices; and a connector for connecting said function control circuit to the plurality of devices, wherein said function control circuit causes the respective displays of the plurality of devices to display a selection state indicating a status of function processing by the plurality of devices, wherein said function control circuit is responsive to a selection of the high-fidelity image processing function at one of the plurality of devices to cause the selected high-fidelity image processing function to be performed, wherein said function control circuit transmits results of function processing among the plurality of devices to enable addition/deletion/correction of the results, and wherein said high-fidelity image processing function includes an image density processing.

3. The information processing system according to claim 2, wherein a respective specific ID number is added to each of the results, and a result is obtained from any of the plurality of devices by the respective specific ID number.

4. A print network system comprising:

a print terminal including:

a first communication circuit adapted for communicating with a network, a memory for storing a plurality of items of information received through said first communication circuit from the network, the plurality of items of information instructing respective printing operations, said memory maintaining each item of information and a respective code identifying each maintained item of information after a respective printing operation is completed, and a print engine for performing the respective printing operations in accordance with the plurality of items of information sorted in said memory; and a network terminal including:

a second communication circuit adapted for communicating with the network, an instruction input circuit adapted for inputting information instructing the respective printing operations, a code input circuit adapted for inputting a code identifying the information inputted by said instruction input circuit, an output circuit adapted for outputting the code inputted by said code input circuit through said second communication circuit over the network to said print terminal, and a receiver for receiving, from said print terminal, an item of information stored in said memory for the outputted code, and for informing an operator of the received information.

5. The print network system according to claim 4, wherein said print terminal has a copying function.

6. The print network system according to claim 4, wherein a respective code is automatically assigned to each item of information by said system.

7. The print network system according to claim 4, wherein the plurality of items of information includes an instruction for editing an image to be printed by said print engine.

8. The print network system according to claim 4, wherein the plurality of items of information includes an instruction indicating a print method to be used by said print engine.

9. The print network system according to claim 8, wherein said instruction designates at least one of double-sided printing, a number of copies, and staple sorting.

* * * * *

UNITED STATES PATENT AND TRADEMARK OFFICE
CERTIFICATE OF CORRECTION

PATENT NO. : 6,286,059 B1
DATED : September 4, 2001
INVENTOR(S) : Takashi Sugiura It is certified that error appears in the above-identified patent and that said Letters Patent is hereby corrected as shown below:

Title page,
Item [56] References Cited, U.S. PATENT DOCUMENTS, insert
-- 3,623,067 11/1971 Deal, Jr. et al.......345/2 --.
-- 5,093,918 03/1992 Heyen et al. ......395/725 --.
-- 5,220,674 06/1993 Morgan et al. .... 395/800 --.

Column 1,
Line 24, "utilization of" should be deleted.

Column 2,
Line 64, "CD-ROM etc." should read -- CD-ROM, etc. --.

Column 3,
Line 8, "Eithernet" should read -- Ethernet --.
Line 21, "describe" should read -- described --; and "an an" should read -- as an --.
Line 26, "respectively" should read -- each --.
Line 37, "denote" should read -- denotes --.
Line 59, "operations" should read -- operates --.
Line 61, "status," should read -- status; --.

Column 4,
Line 26, "5025," should read -- and 5025, --.
Line 29, "processing" should read -- processing, --.
Line 35, "5030," should read -- and 5030, --.
Line 36, "Italic-format" should read --italic-format --.
Line 37, "processing" should read -- processing, --.
Line 44, "processing" should read -- processing, --; and "5034," should read -- and 5034, --.
Line 59, "unit," should read -- increments, --.
Line 65, "5039," should read -- and 5039, an --.

Column 5,
Line 2, "a" should be deleted.
Line 23, "is" should read -- is a --.
Line 27, "platen 2:" should read -- platen 2; and --.
Line 42, "(toner" should read -- (toner) --.
Line 44, "is" (first occurrence) should read -- are --.
Line 64, "show" should read -- shows --.
Line 66, "scanner 2500" should read -- scanner 2100 --.

CERTIFICATE OF CORRECTION

PATENT NO. : 6,286,059 B1
DATED : September 4, 2001
INVENTOR(S) : Takashi Sugiura It is certified that error appears in the above-identified patent and that said Letters Patent is hereby corrected as shown below:

Column 6,
Line 3, "(analog)corresponding" should read -- (analog) corresponding --.
Line 7, "if" should read -- in --.
Line 43, "O-bit" should read -- 8-bit --.

Column 8,
Line 5, "higher" should read -- highest --.
Line 38, "and" should read -- or --.
Line 45, "and" should read -- or --.
Line 65, "device etc." should read -- device, etc. --.

Column 9,
Line 53, "that" should read -- that since --.
Line 63, "maybe" should read -- may be --.

Column 10,
Line 5, "functions and" should read -- functions --.
Line 7, "is" should read -- are --.
Line 9, "tatch-panel." should read -- touch-panel. --.
Line 12, "is" should read -- are --.
Line 39, "time." should read -- times. --.
Line 45, "portion processings" should read -- portion "MARKETING" at the upper portion, fattening processing is performed on this portion, and color-pattern conversion (i.e., to converting the colors into different patterns) is performed on the portion of the color bar graph.

At this time, an operator selects reading by the scanner from the display operation panel 1500 of the copying machine 120. Next, the operator designates an area in the original 601. For example, as shown in (B) of Fig. 8, the character portion "MARKETING" is designed as an area 1, and the portion of the bar graph is designed as area 2 in area-designated image 602.

Then, desired processing are set with respect to the designated areas. That is, fattening processing is set with respect to the area 1, and color-pattern conversion is set with respect to the area 2.

On the other hand, the CPU 4100 adds ID's respectively unique to the set processings, and stores the data with the ID's in the memory in the copying machine. Similar to the first embodiment, the CPU 4100 executes corresponding processing at the appropriate device. Fig. 8 (C) shows the results of the processings as an image 603. Note that at this time, the ID's defining the contents of the processings may preferably be stored within the filing device 130. The actual processings --.

UNITED STATES PATENT AND TRADEMARK OFFICE

CERTIFICATE OF CORRECTION

PATENT NO. : 6,286,059 B1
DATED : September 4, 2001
INVENTOR(S) : Takashi Sugiura It is certified that error appears in the above-identified patent and that said Letters Patent is hereby corrected as shown below:

Column 11,
Line 16, "input" should read -- inputs --.
Line 24, "fed-back" should read -- fed back --.
Line 30, "computer 11," should read -- computer 110, --.

Signed and Sealed this

Second Day of April, 2002

Attest:

JAMES E. ROGAN
*Director of the United States Patent and Trademark Office*

*Attesting Officer*